United States Patent
Ryley et al.

(10) Patent No.: US 8,315,653 B2
(45) Date of Patent: Nov. 20, 2012

(54) ROUTING MESSAGES BETWEEN CELLULAR HANDSETS AND A MULTI-HANDSET CORDLESS TELEPHONE SYSTEM

(75) Inventors: Gordon Ryley, Calgary (CA); Julian Lee, Richmond (CA); Sukhdeep Hundal, Surrey (CA)

(73) Assignee: VTech Telecommunications Ltd., Hong Kong (HK)

( * ) Notice: Subject to any disclaimer, the term of this patent is extended or adjusted under 35 U.S.C. 154(b) by 737 days.

(21) Appl. No.: 12/348,190

(22) Filed: Jan. 2, 2009

(65) Prior Publication Data

US 2009/0239528 A1    Sep. 24, 2009

Related U.S. Application Data

(60) Provisional application No. 61/018,754, filed on Jan. 3, 2008.

(51) Int. Cl.
*H04W 4/00* (2009.01)
*H04M 3/42* (2006.01)
(52) U.S. Cl. .................. 455/466; 455/415; 455/417
(58) Field of Classification Search .............. 455/415, 455/417, 466
See application file for complete search history.

(56) References Cited

U.S. PATENT DOCUMENTS

| | | | |
|---|---|---|---|
| 6,434,394 B1 * | 8/2002 | Grundvig et al. | 455/463 |
| 6,546,098 B1 * | 4/2003 | Henderson | 379/397 |
| 6,788,953 B1 * | 9/2004 | Cheah et al. | 455/550.1 |
| 2003/0092453 A1 * | 5/2003 | Mills et al. | 455/463 |
| 2003/0157929 A1 * | 8/2003 | Janssen et al. | 455/416 |
| 2004/0132500 A1 | 7/2004 | Rogalski et al. | |
| 2005/0197061 A1 | 9/2005 | Hundal | |
| 2008/0090597 A1 * | 4/2008 | Celik et al. | 455/466 |

OTHER PUBLICATIONS

Boehret, K., "The Mossberg Solution, Extending Cellphones' Reach" (URL:http://online.wsj.com/article_print/SB119439465387884550.html)The Wall Street Journal, Nov. 7, 2007; p. D8.

* cited by examiner

*Primary Examiner* — Marisol Figueroa
(74) *Attorney, Agent, or Firm* — McAndrews, Held & Malloy Ltd.

(57) ABSTRACT

Systems and methods are provided for routing data messages between a cellular telephone and a cordless telephone system having a plurality of cordless handsets configured to communicate with a single cordless base station when in range. Messages are received at the cordless base station via a first radio frequency transfer protocol. The message is transmitted to the cordless base station from the cellular telephone after the cellular telephone has received the message from a cellular network. The cordless base station transmits the message to a desired one of the plurality of cordless handsets via a second radio frequency transfer protocol. The desired one of the plurality of cordless handsets is chosen based on predetermined message routing settings.

31 Claims, 6 Drawing Sheets

ROUTING MESSAGES BETWEEN CELLULAR HANDSETS AND A MULTI-HANDSET CORDLESS TELEPHONE SYSTEM

CROSS-REFERENCE TO RELATED APPLICATION

This application claims the benefit of U.S. Provisional Patent Application Ser. No. 61/018,754 filed Jan. 3, 2008, which is herein incorporated by reference in its entirety.

BACKGROUND

1. Field of the Invention

The present invention relates generally to facilitating communications between a cellular telephone and a multi-handset cordless telephone system and, more particularly, to a system for routing messages between a cellular telephone and one or more handsets in a multi-handset cordless telephone system.

2. Background of the Invention

Many users (e.g., consumers and business persons) possess both a landline telephone and a cellular telephone. While telephone infrastructure varies from country to country (and indeed, this invention is not limited to any particular country), the United States infrastructure provides a useful starting point for purposes of this description. In the United States, a landline telephone can be a cordless or corded telephone that is coupled to a central office ("CO") of a local exchange carrier ("LEC") such as a Regional Bell Operating Company ("RBOC"), a competitive local exchange carrier ("CLEC"), and so on, and is commonly referred to as a PSTN-based telephone system. Cordless telephones have no cord between the handset and base. Instead, the handset and base each have a radio transmitter, receiver, and antenna to allow communication between the handset and base. Typically, the handset includes a rechargeable battery, and the base is powered by current from an alternating current ("AC") outlet (e.g., of a house or office). In a residential environment, the base is typically coupled to the CO via one or more wires, such as an RJ-11 wire that couples the base to an RJ-11 jack on a wall. The RJ-11 jack is typically coupled to the CO via a twisted-pair wire.

As used to describe the background and embodiments of the present invention, the term "coupled" encompasses a direct connection, an indirect connection, or a combination thereof. Two devices that are coupled can engage in direct communication, in indirect communication, or a combination thereof. Moreover, two devices that are coupled need not be in continuous communication, but can be in communication typically, periodically, intermittently, sporadically, occasionally, and so on. Further, the term "communication" is not limited to direct communication, but also includes indirect communication.

The range of effective communications between a handset and base can be from about 10 feet to several miles depending on factors such as product design, operating radio frequency, environmental conditions, and legal restrictions (e.g., laws and regulations). Examples of known operating radio frequencies for cordless telephone communications in the United States include 900 Megahertz ("MHz"), 2.4 Gigahertz ("GHz"), 5.8 GHz, a combination thereof, and so on.

An example of a cellular telephone is a handheld cellular radio transceiver (transmitter/receiver) that operates in a cellular service area composed of a plurality of cells. Each cell is populated with one or more low-powered radio transceivers that communicate with the cellular telephones in or about the cell. Adjoining cells typically operate at different radio frequencies. Each cell's radio transceiver is coupled to a Mobile Telephone Switching Office ("MTSO") that can monitor the movement, if any, of the cellular telephone (e.g., by determining or receiving signal strength indicators corresponding to the cellular telephone) through the cell such that, at the proper time, the cellular telephone can be handed-off from a current cell to a next cell. Examples of cellular telephone systems include Personal Communications Service ("PCS") systems, Global System for Mobile Communications ("GSM") systems, Code Division Multiple Access ("CDMA") systems, Time Division Multiple Access ("TDMA") systems, analog and/or digital Advanced Mobile Phone Service ("AMPS") systems, and so on. Cellular telephone systems in the United States operate at or around 1900 MHz (e.g., GSM 1900 systems, Digital AMPS, and CDMA 1900 systems), in the 800-900 MHz range (e.g., analog AMPS), and so on.

Many users own both a landline telephone and a cellular telephone. There is a strong user desire to use cellular telephone services from the comfort of the home landline telephone. Other users want to use the handset of their cordless telephone to communicate with others via the wireless network of the cellular telephone.

With the rise of the use of short-range radio frequency communications, such as the Bluetooth specifications, cellular telephones have been configured to communicate with PSTN (public switched telephone network) telephone hardware, and vice versa, in order to establish a local voice connection between the two systems. One such system has been described in U.S. Patent Application Publication No. US2004/0132500, filed Jul. 17, 2003, now U.S. Pat. No. 7,363,045, issued Apr. 22, 2008, which is incorporated herein by reference in its entirety.

In establishing a voice link between a cellular telephone and a cordless telephone system, a cordless telephone system is configured to effectively support a second telephone line by using the cellular phone link as a replacement for a traditional PSTN connection. Using the cellular phone connection as this "second line" requires an interface between the cellular phone and the cordless telephone system. Short-range radio frequency specifications, such as Bluetooth, have been used to provide this connection. These conventional systems, however, have limited capabilities since they only enable simple voice calling (e.g., making and receiving a call) and limited data transfer. The advantage of the conventional cellular-to-cordless interconnection is that it allows multiple cordless handsets throughout a home to make and receive calls made to the cellular handset. This reduces the need for a cellular phone to be carried throughout the house, reduces cellular radiation because lower power cordless phones are used, and provides the convenience of a "second line" without the need to add an actual second PSTN line.

Several means for providing messaging services are currently provided. One system is simply a personal computer running messaging software. This device is expensive and must always be on to support reliable messaging. In addition, the personal computer must be connected to an external network (e.g., the internet) using a suitable connection (e.g., broadband, wireless, or dial-up). This external network connection also adds additional monthly subscriber costs.

Another conventional system uses WiFi-enabled voice/messaging terminals. These terminals use "Voice over IP" (VoIP) to provide voice services over a wireless internet link. Since these services are internet-based, they can also provide messaging applications. One disadvantage of this system is cost. The terminals use 802.11 technology, which uses more expensive components over cordless and has a greater power consumption than cordless. Another disadvantage of this system is that, although data applications such as messaging are fairly reliable, VoIP over WiFi is still very unreliable. Thus, the system provides a good messaging device but a poor telephony device. WiFi terminals require a WiFi router at an additional cost and also an external network connection adding further subscriber costs.

Another conventional system is PC-assisted messaging terminals with voice capabilities. These devices support cordless telephony with a USB or Ethernet connection to an external PC that is responsible for providing the messaging support. Although more cost effective than the WiFi-enabled terminal, they require an active (powered) personal computer plus the external network connection.

BRIEF SUMMARY OF THE INVENTION

The present invention can provide an improved interface between a cordless telephone system and a cellular telephone. Such an improved interface allows messaging services offered by cellular phones to be extended to cordless telephone systems. In this manner, messages to or from a cellular phone that is connected to the cordless telephone system can be routed to or from one or more cordless handsets in the cordless system. This reduces the necessity for a user to constantly be in close vicinity with his or her cellular phone if messaging services are intended to be used. In addition, cellular radiation is reduced.

As used herein, "messages" may refer to any of a variety of data transmissions and may include, for example, text messages, short messages service (SMS) messages, digital photograph transmissions, video transmissions, and attachments to text messages.

In the case of a cordless telephone system having multiple cordless handsets, the present invention further provides a system for routing messages to or from one or more cellular telephones to one or more cordless handsets in a cordless telephone system.

DETAILED DESCRIPTION OF THE INVENTION

The present invention provides methods and apparatuses for transferring messages between a cellular handset and a cordless phone system, and routing such messages to one or more individual handsets that are part of the cordless phone system.

Figure 1:
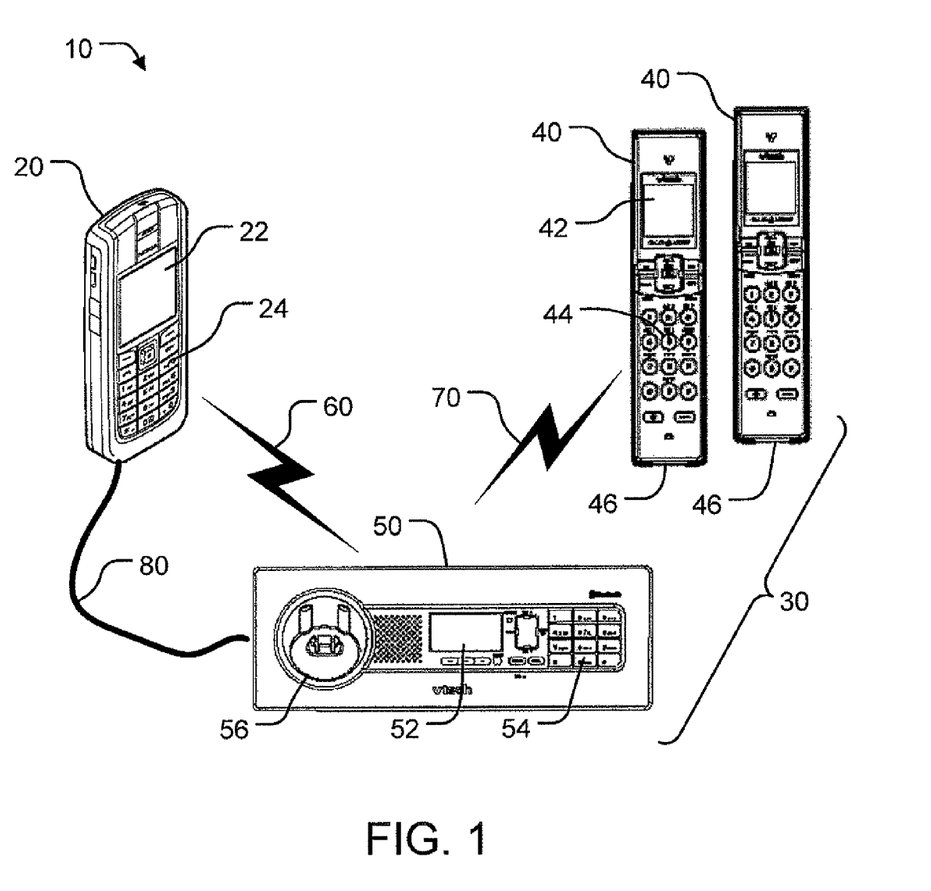
FIG. 1 is a schematic diagram showing system components and interfaces used to support message routing from a cellular telephone to a multi-handset cordless system, according to an embodiment of the present invention.

As shown in FIG. 1, a system 10 for transferring and routing messages includes a cellular phone 20 and a cordless telephone system 30. The cordless telephone system 30 can include a base station 50 and one or more cordless handsets 40 (two are shown in FIG. 1). The cellular phone 20 may be connected to any cellular or long-range wireless network as is known in conventional systems. The cellular phone 20 may include a display 22 for displaying graphics, numbers, messages, or any other desired information. The cellular phone may further include an alphanumeric keypad 24 for entry of information. Although not shown, the cellular phone 20 may instead include a combined display and data entry mechanism, such as a touch-screen, as is known in the art.

The base station 50 of the cordless system 30 may likewise include a display 52 and alphanumeric keypad 54 for information entry. Additional information entry mechanisms may be provided to enhance the user interface of the base station 50. The base station 50 can further include a charging cradle 56 to receive a cordless handset 40 when the handset is not in use in order to charge a handset battery via charge terminal 46 of the handset 40. The handset 40 can also include a display 42 and an alphanumeric keypad 44 (which may also be combined as a touch-screen).

The communication interface 70 between the base station 50 and the handsets 70 may utilize conventional radio frequency bands as known in the art to facilitate communication in cordless telephone systems. As mentioned above, examples of such bands are the 900 MHz, 2.4 GHz, and 5.8 GHz frequency bands. The cordless telephone system 30 can be configured to allow the base station 50 to selectively and individually address and communicate with each of the handsets 40 by using unique identifiers encoded in data transmissions or by any other known means.

In accordance with the present invention, messages that are ordinarily received by a cellular phone 20 are transferred from the cellular phone 20 to a base station 50 of a cordless telephone system 30 and are then routed to one or more handsets 40 of the cordless telephone system so that they may be read by a user of the handset 40. In addition, messages may be sent from a handset 40 of a cordless system 30 to the base station 50, and to the cellular phone 20, which then sends the message to an intended recipient through the cellular network. The present disclosure will first describe a mechanism for routing messages between a cellular phone 20 and the base station 50 of the cordless system 30. Then, a mechanism will be described for routing messages within the cordless system 30 (i.e., between the base station 50 and one or more of the handsets 40).

Transferring Messages Between Cellular Handset(s) and a Cordless System:

The cordless telephone base station 50 may be equipped with a short-range radio frequency transceiver, such as a Bluetooth transceiver, or a hard-wire serial port that supports a data connection between the cordless telephone base station 50 and a similarly equipped cellular telephone 20. In an embodiment, a Bluetooth transceiver is used as a wireless communication interface 60 and is advantageous in that it does not require a physical hardware connection (i.e., via cable) between the cellular phone 20 and the base station 50. In other embodiments, a hard-wire serial port communication interface 80 is implemented. Such embodiments may be advantageous in systems that are not equipped to support short-range wireless communications. One of skill in the art will appreciate that, although a wireless interface 60 will be primarily referred to herein, the present invention is nonetheless applicable to systems utilizing a hard-wire interface 80 between a cellular phone 20 and a cordless base station 50 and that the teachings herein may be equally applied to such a system.

In embodiments employing a Bluetooth interface 60, it is assumed that the cellular phone 20 and cordless system 30 have already discovered and paired to each other as is conventionally known.

Bluetooth supports many different profiles that provide connectivity between devices to support data transfer, communication, voice, etc. Bluetooth, however, does not currently support a messaging profile that specifies a standardized method to send and receive messages over cellular phones 20 under the control of a Bluetooth enabled external device.

Many Bluetooth cellular phones 20 support a serial port connection over the wireless Bluetooth link. This feature is known as the Serial Port Profile. Using the Serial Port Profile, the cordless system 30 can communicate using Attention (AT) commands that provide access to various functions of the cellular telephone 20 including and not limited to: dialing, answering calls, SIM card functions, Short Messaging System (SMS) functions, and keypad control.

In accordance with the present invention, SMS messages (as used in GSM cellular technology) are sent to and received from a cellular phone 20 using AT-commands. The specific AT-command protocol is well known in the industry and a set of AT-commands are specified in ETSI standards documents GSM 07.05 and GSM 07.07, which are incorporated herein by reference. However, there are exceptions in that some cellular phones do not consistently support the AT-commands as defined in GSM 07.05 and 07.07. In this case, some further enhancements may be made to support the sending and retrieval of messages from a cellular phone 20 using a wireless or wired serial port connection.

In an embodiment, SMS messages may be sent and received using a serial port by using AT+CMGS (message send) and AT+CMGR (message read) commands. An AT+CNMI (new message indicator) command may also be used, which tells the cellular phone 20 to send out a notification message whenever a new message has been received.

Some cellular phones 20, however, do not support the AT+CNMI command. In such a case, one way to know if new messages have arrived is to periodically check or poll for new messages using the AT+CMGR command. This polling may result in decreased cellular battery life. Therefore, an intelligent algorithm may be used to minimize polling for messages and still provide a timely notification of new messages to the user while maximizing battery life, as will be described below.

In some cases in which AT-commands for SMS message functions are not supported, it may be possible to use the AT-commands for keyboard control to send messages.

As described above, one method for message notification is to use the AT+CNMI command. This command will send a message whenever a new message has arrived. But in some cellular devices, this command is not supported even though the send and receive commands are. In the case where AT+CNMI is not supported, in accordance with the present invention, an intelligent polling algorithm is described whereby adequate and timely notification of new messages is provided with minimal impact on cellular handset life.

Figure 2:
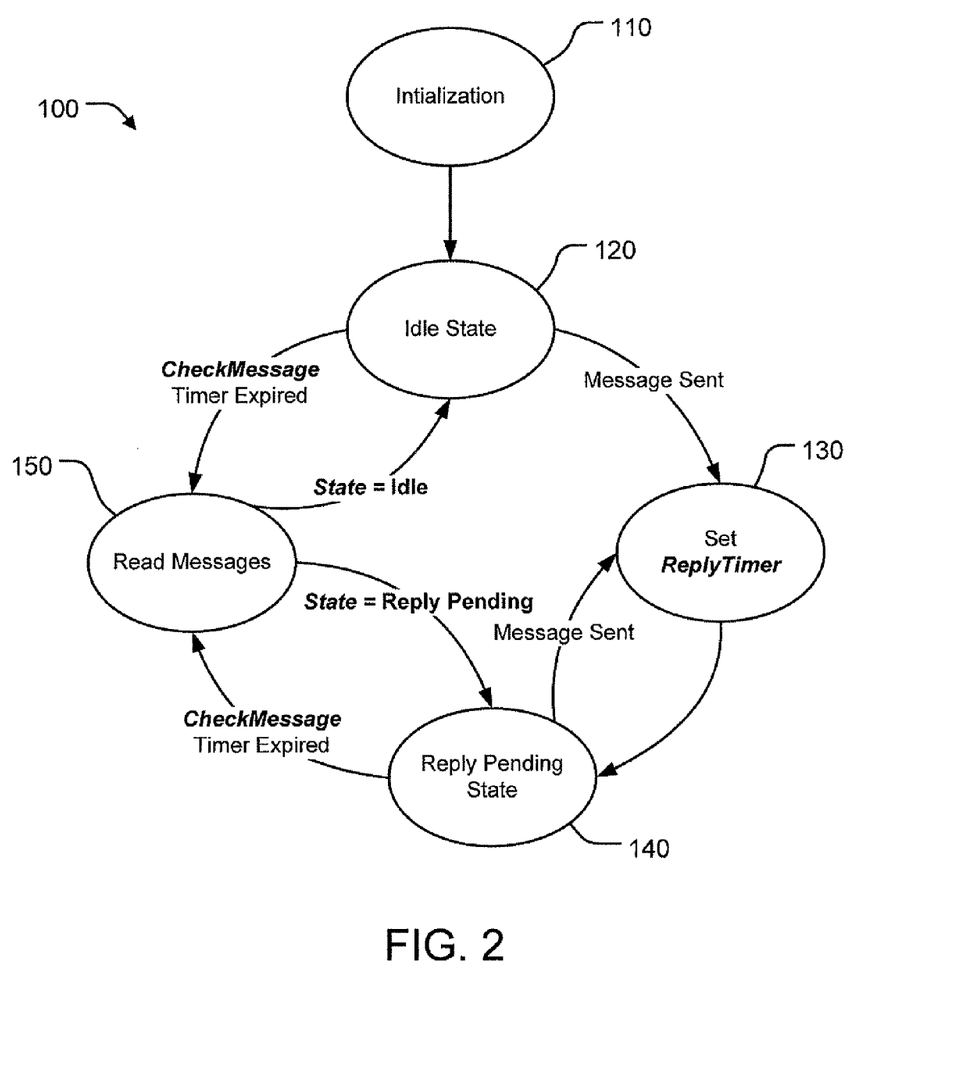
FIG. 2 is a state diagram for an algorithm for receiving messages from a cellular phone, according to an embodiment of the present invention.

FIG. 2 shows a state diagram 100 for a non-CNMI algorithm for the notification of new messages. The non-CNMI algorithm controls the periodic read of messages from the cellular phone 20 by the cordless system 30 (specifically, the base station 50). The cordless system 30 determines an idle condition based upon the message traffic between the cordless and cellular devices. If there is no traffic for a specified and configurable time set by a first timer, referred to herein as the reply timer, the cordless system 30 indicates an "idle" state 120. In the idle state 120, the checking for messages on the cellular phone 20 using the AT+CMGR command occurs less frequently and the period is set by a second programmable timer, referred to herein as the check message timer. Whenever an outbound (cordless-to-cellular) message is sent, the reply timer is activated 130 and the reply pending state 140 is entered. While reply timer is active, the check message timer is configured to check for messages at a faster rate. Once reply timer expires, then the check message timer is configured to check for messages at the slower or idle state rate.

The state diagram 100 and non-CNMI algorithm will be described in further detail below with reference to FIGS. 3-7, which show expanded steps for each of the states 110, 120, 130, 140, 150.

Figure 3:
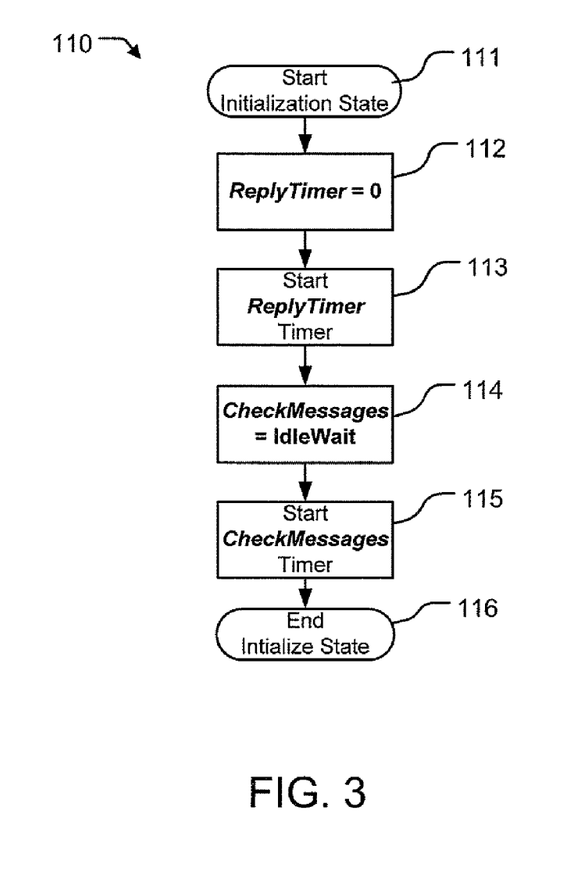
FIG. 3 is an expanded schematic view of an initialization state, according to an embodiment of the present invention.

The initialization state 110, shown in FIG. 3, creates and initializes the first and second timers with preferably a one second resolution accuracy called reply timer and check message timer. As shown, the initialization state 110 starts at 11 and sets reply timer to zero at step 112. Reply timer is started at 113 and the timer check messages is set to idle wait, which refers to the time for the slower, idle state rate, for checking for new messages on the cellular phone 20. The check messages timer is then started at 11 and the initialization state 110 ends at 116.

Figure 4:
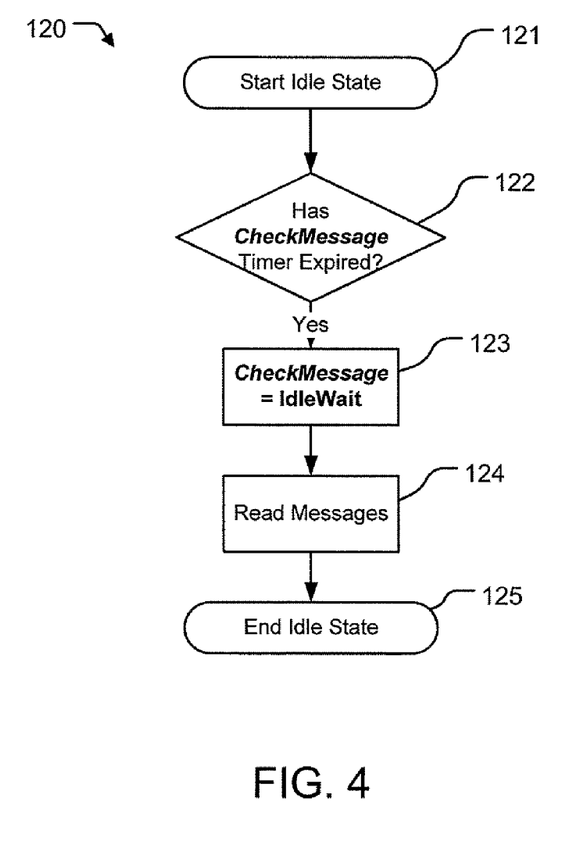
FIG. 4 is an expanded schematic view of an idle state, according to an embodiment of the present invention.

FIG. 4 shows the idle state 120 in an expanded view. The idle state 120 becomes active whenever the reply timer is expired or non-active. Thus, once the reply timer expires in the initialization state 110, the idle state 120 starts at 121. Once in the idle state 120, the system waits for the check message timer to expire at step 122, and then re-initializes the check messages timer at 123 to the idle wait value and transitions to the read messages state 150 at step 124. The idle state 120 then ends at step 125.

Figure 5:
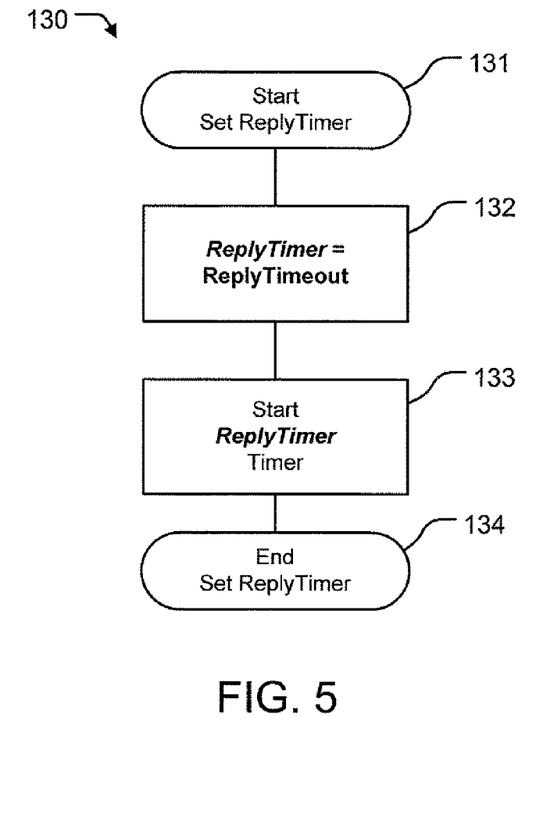
FIG. 5 is an expanded schematic view of a set reply timer state, according to an embodiment of the present invention.

FIG. 5 shows the set reply timer state 130 in an expanded view. This state is started at 131 whenever a message has been sent. The set reply timer state 130 initializes and starts the reply timer. As shown, the reply timer is set to the reply timeout value at 132 and is started at step 133. The set reply timer state 130 then ends at 134.

Figure 6:
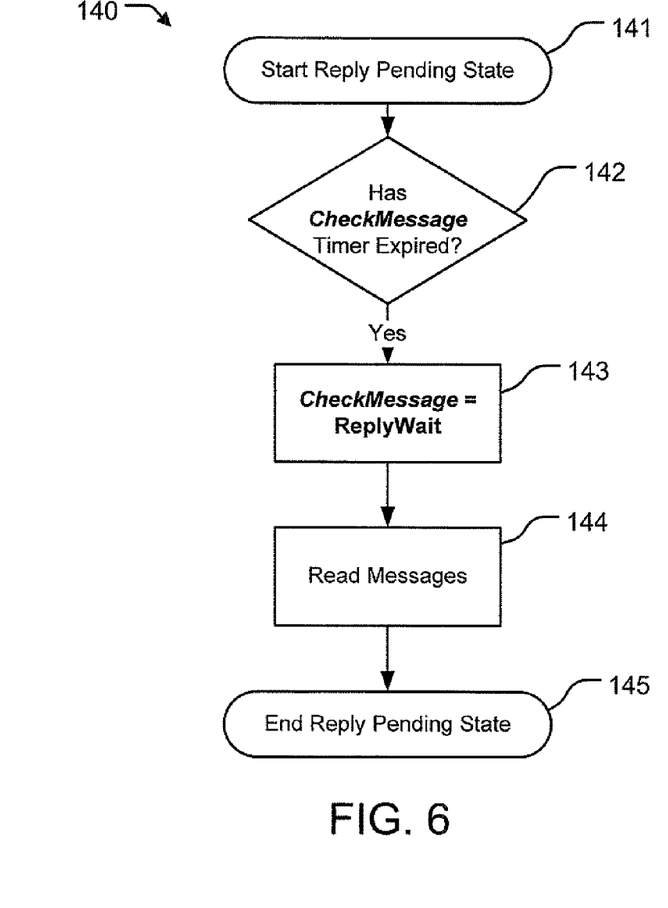
FIG. 6 is an expanded schematic view of a reply pending state, according to an embodiment of the present invention.

The reply pending state 140, shown in FIG. 6, is active whenever the reply timer is active. The reply pending state 140 starts at step 141 and waits for the check message timer to expire at step 142. The state then re-initializes the check message timer to the reply wait value at step 143 and transitions to the read messages state 150 at step 144. The reply pending state 140 then ends at step 145.

Figure 7:
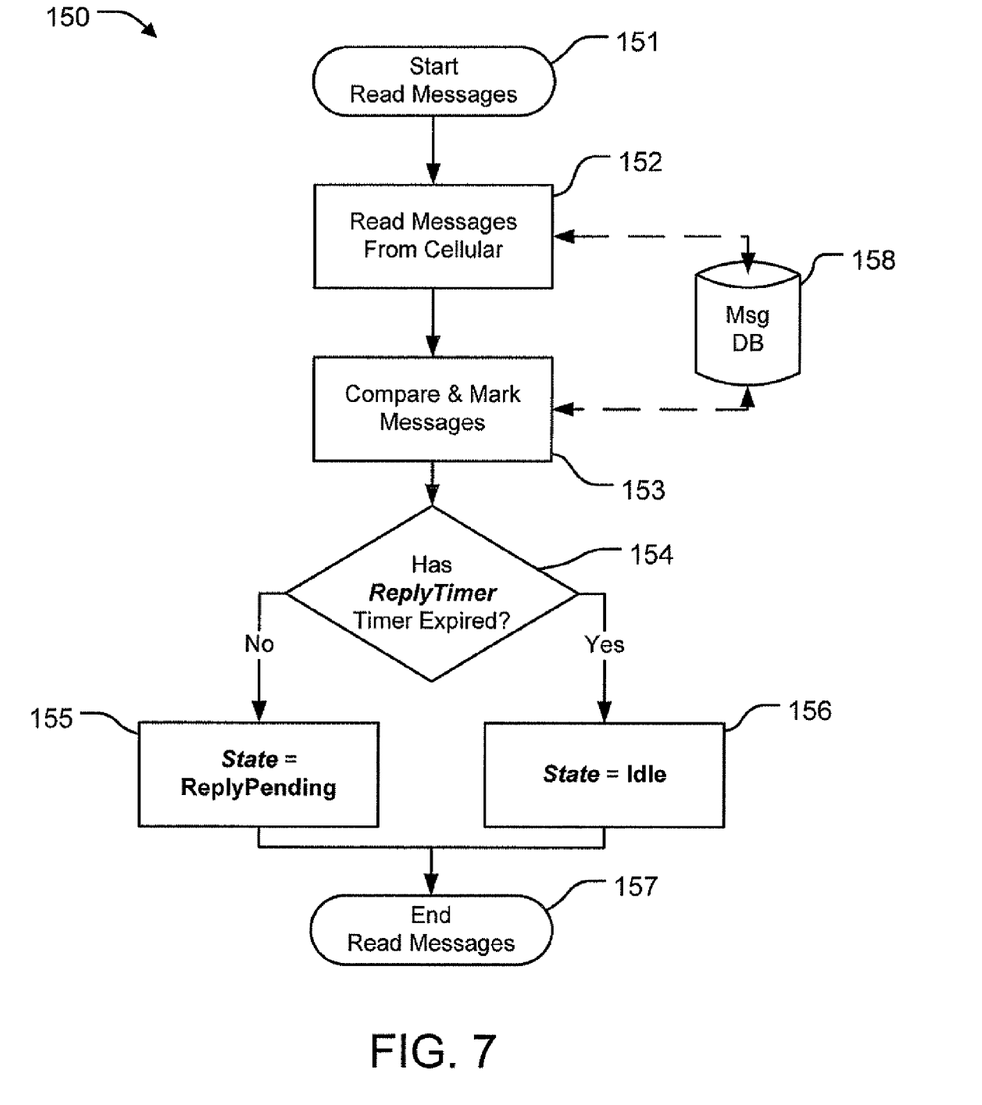
FIG. 7 is an expanded schematic view of a read messages state, according to an embodiment of the present invention.

FIG. 7 shows the read messages state 150 in an expanded view. The read messages state 150 starts at step 151 whenever the check messages timer has expired (e.g., either after the idle wait value set in initialization state 110 or idle state 120, or after the reply wait value set in reply pending state 140). In step 152, the messages are transferred and read from the cellular phone 20 and are saved to a message database 158, which may be resident on the base station 50. In step 153, messages in the database are compared with read messages and any new messages are marked as new. Then, the state is transitioned depending upon the condition of the reply timer in step 154. If the reply timer is still active, the state is set to reply pending 140 at step 155. If the reply timer is not active, the state is set to idle 120 at step 156. The read message state 150 then ends at step 157.

Routing Messages within the Cordless System:

Once the messages have been received by the base station 50 from the cellular phone 20, there are several considerations to address for routing the messages to and from multiple cordless handsets 40. Message routing can fall into one of the three categories below:

A. Private (One-to-One):

A cellular phone 20 can be a very personal communication device. Accordingly, it may be desirable for messages that are transferred to a cordless system 30 to only be routed to a single particular cordless handset 40. Thus, the present invention provides a system for directing messages to a particular handset 40, rather than to all of a plurality of handsets 40 in a cordless system 30.

The routing of messages to and from a specific cordless handset 40 is referred to herein as a "private" routing function. In one embodiment, all messages received from a cellular phone 20 could be routed to one specific designated cordless handset 40 in the system 30. In this manner, no special instructions are needed to discriminate between received messages, as they will all be routed to a particular handset 40. The particular handset 40 that receives the messages may be selected by a user or may be set to a particular handset by factory settings.

In another embodiment, all messages from the cellular phone 20 may be routed to all cordless handsets 40, but with the added provision of a password to only allow the targeted user to read them (e.g., by using a PIN number). Users may be prompted on the cordless handset 40 to enter a password or PIN to enable them to read any received messages.

In yet another embodiment, messages may be intelligently routed to the cordless terminal that is currently being used or most recently used, which is further described below.

B. Public (One-to-All)

The second method of routing messages to cordless handsets 40 may be applicable in environments in which a cellular phone 20 is the only phone in a residence and messages must be broadcast to many cordless devices 40. This is referred to herein as a "public" routing function. In an embodiment, all messages received from the cellular phone 20 are routed to all cordless handsets 40. Thus, no special addressing or identifying algorithm is necessary in this case.

C. Hybrid (One-to-Many and One-to-All)

A routing function that supports both "private" and "public" routing is referred to herein as a "hybrid" function. Hybrid routing functions may be applicable in environments in which a cellular telephone 20 is being used as the sole voice telecommunication device (e.g., wireless local loop device) in the residence. In such cases, or in cases generally where it is desired to utilize both the private and public routing functions, there may be a need to re-direct messages destined for multiple residents to specific handsets. In a sense, the routing categories can be narrowed down to essentially hybrid and public, since public means "all" and "private" is a unique case of "hybrid" with only one handset specified.

Routing Methods Supported in Multi-Handset Cordless System:

The following methods may be used to route messages within a multi-handset cordless system 30 and to or from one or more cellular phones 20.

A. Method 1—Pre-Defined Caller ID Matching

Figure 8:
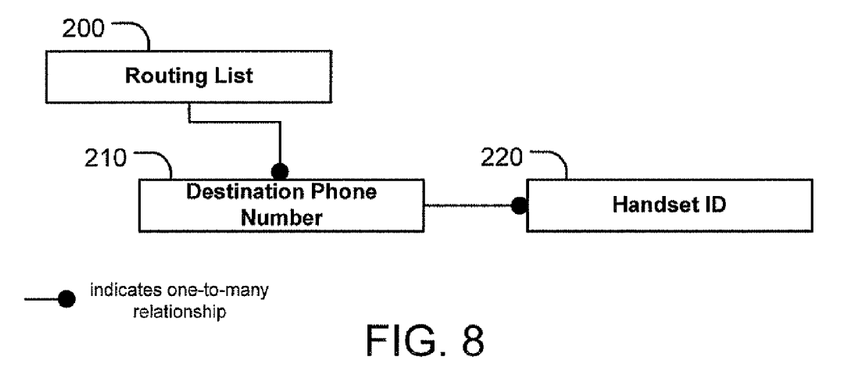
FIG. 8 is a schematic diagram of a routing list, according to an embodiment of the present invention.

In accordance with an embodiment of the present invention and with reference to FIG. 8, a first method may be used that involves the cordless system 30 having prior knowledge of a list of telephone numbers and a routing disposition associated with each of the numbers. The user would pre-program the telephone numbers of his contacts into the cordless system 30 (e.g., the base station 50). The user would manually associate each of the telephone numbers with one specific handset ID or user ID or all handsets. In this manner, a global list or database of contacts and their telephone numbers is maintained by the cordless system, with each contact being associated with a particular handset or plurality of handsets. Messages originating from a particular contact will be routed to the handset(s) associated with that contact's telephone number in the global list or database.

Alternatively, a database or plurality of databases may be created in the cordless system 30 that contain separate lists of contacts and their telephone numbers, with each list being associated with one or more particular handsets 40 in the cordless system 30. When a message originates from a contact having a telephone number stored in one of the lists, the cordless system may be configured to route the message to the handset associated with that list. Lists can be associated with one handset or a plurality of handsets as desired by a user.

A routing list 200 may be created that would contain the following recorded information: destination phone number 210 (a phone number for the destination of the message) and handset ID 220 (identification of handset 40 where messages are to be routed). The message destination phone number 210 field may be useful when there are more than one cellular telephones connected to a cordless telephone system as a further means to coordinate and configure the routing of incoming messages.

B. Method 2—Historical Caller ID Matching

Figure 9:
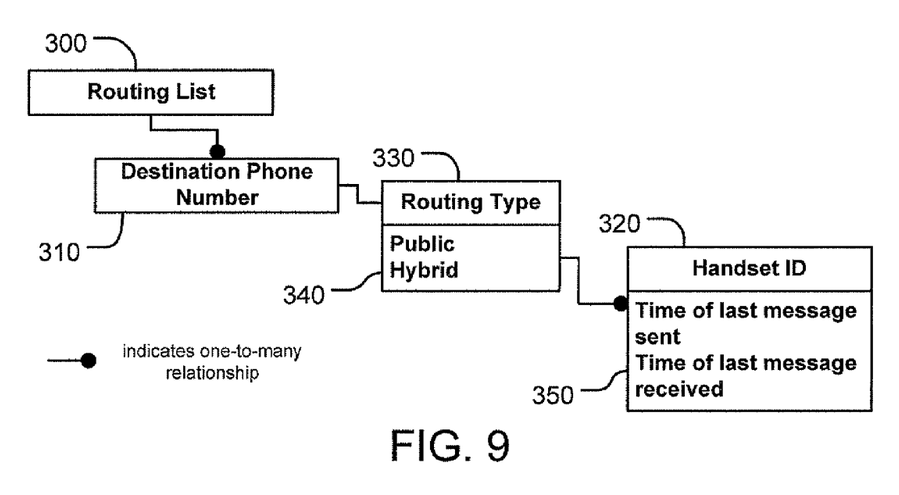
FIG. 9 is a schematic diagram of a routing list, according to another embodiment of the present invention.

In accordance with another embodiment of the present invention and with reference to FIG. 9, a second method may be employed that uses the history of outgoing messages to determine the routing behavior.

In a multiple handset system 30, a specific handset 40 is typically associated with a specific location or even user (e.g., bedroom 1, den, kitchen, Mary, Sally, or Fred). For example, Mary sends a message using her cordless handset 40 identified as "Mary" to her friend Pat on the cellular network. Included in the message record is the phone number of Pat. This phone number is automatically added to the global routing list 300, which identifies that any messages received from Pat should be routed to the handset 40 identified as "Mary."

The routing list 300 may also contain the following information: destination phone number 310 (a phone number for the destination of the message), handset routing type 330 (with further information 340 regarding whether the routing method is "public" or "hybrid", if type is "public", then all messages are routed to all handsets; and if type is "hybrid", then all messages are routed to one or multiple handset IDs), and for each handset ID 320 associated with a particular contact number, the following information 350 (FIG. 9): (i) time of last message sent from this handset to this destination, and (ii) time of last message received from this destination.

The message may be sent from the cordless system 30 to the cellular phone 20 where it is transmitted to the cellular network message center and eventually reaches Pat. When Pat replies, the reply message is received by the cellular phone 20 and transferred to the cordless system 30 where it is saved in memory, as described above. The incoming message record contains Pat's phone number, which is compared against the routing list 300. Based upon the information in the routing list 300, this phone number is associated with the handset 40 identified as "Mary" and the notification of a new message is sent to that handset 40.

The user of handset "Mary" once receiving the notification can download the saved message from the cordless system 30 and review it. In cases where multiple handsets 40 share the same contact name, for example, if Pat is also a friend of Mary's brother Fred (in the same household), then the routing list 300 would show two handsets 40 associated with Pat's phone number. In such cases, the routing system may be configured to send the message to both handsets or if, for example, privacy is a concern, other methods may be implemented to determine which handset receives the message.

One such method compares the time stamp of the incoming message to the time stamps of the last sent messages from each handset 40. If the time stamp is within a pre-set time of the last sent message, the incoming message notification will be sent to that handset 40 first. If there is no response from the handset 40 within a reasonable pre-set time, then notifications can be sent to all handsets 40 that are associated with a particular message.

For purposes of security, in an embodiment, the user of the handset 40 can be prompted for a password in order to download the message. In other embodiments, the incoming message from the cellular phone 20 may be deleted under control of the cordless system 30 after being copied into the cordless system database. In still other embodiments, messages may be encrypted when read into the cordless system 30 to prevent unintended reading.

C. Method 3—Handset Tags within Message

In accordance with another embodiment of the present invention, a third method may be utilized to specify routing of a message to a specific handset 40 at a location by an outside sender. In accordance with the third method, the sender can identify the specific handset 40 by adding a handset identification to the body of the text message during composition.

The format of this type of message may be, for example:
<IDString><Message Body Text>,
where <IDString> is an alphanumeric string containing a tag identifier string (e.g., "HS#") plus handset number (e.g., "HS#1"), or even the handset or user name (e.g., "Mary"). The string <Message Body Text> would be the actual text message that is desired to be sent.

An example of such text messages would be:
"HS#3—Meet you at 10 pm" or
"Mary—Meet you at 10 pm."

When a message is received by the destination cellular phone 20 that is interconnected to the cordless system 30, the cordless system 30 can parse the incoming message to look for the <IDString> and make a decision on how to route the incoming message.

D. Routing Control By Handset

In accordance with another embodiment of the present invention, the routing of messages can be controlled in part or in whole by settings, databases, or algorithms stored on each of the cordless handsets in the cordless telephone system.

For example, in one embodiment, the base station may transmit all received messages from an associated cellular telephone to each of the cordless handsets in the cordless system. Each handset may have stored therein a list of contacts along with their telephone numbers (or other identifying information of the message creator) pre-loaded. The lists on each of the handsets may be different and may be maintained by a user who typically uses a particular handset. If the telephone number (or other identifying information) of the message originator matches information in the list the handset allows a user to view the message at that handset. If the identifying information of the message does not match identifying information in the list, that handset blocks access to the message, deletes the message, or otherwise disregards the message. In some embodiments, the handset may be configured to send a signal to the base station to indicate that a message has either been provided access to or has been blocked, depending upon whether the identifying information matches information in the stored list. If all of the handsets in the cordless system indicate that the information does not match the lists, the base station may be configured to send a signal to each handset to indicate that access should be given at each handset since the number is unknown (or otherwise not associated with a particular handset).

In another embodiment, instead of transmitting the messages to each cordless handset in the cordless system, different contact lists can be stored at each handset and communication between the handsets and the base station may be engaged in order to first determine to which handset to transmit an incoming message. For example, a user that typically uses a particular handset can create and maintain his or her own contact list at their preferred handset that includes telephone numbers or other identifying information associated with each contact. When an incoming message is received at the base station, it can send out query signals containing predetermined identifying information of the message to each of the handsets. Each handset may then compare the information with the stored lists and reply to the base station with a signal indicating whether a match has been made. The base station may then transmit the incoming message to one or more handsets indicating a match. If no matches are made, the base station may be configured to transmit the message to all of the handsets since the message originator in that case is unknown (or otherwise not yet associated with a particular handset).

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of routing data messages between a cellular telephone and a cordless telephone system, the cordless telephone system having a plurality of cordless handsets configured to communicate with a single cordless base station when in range, the method comprising:

receiving an incoming text message comprising a message body authored by a sending user to be viewed by a receiving user, wherein the incoming text message is received at the cordless base station from a cellular telephone after the cellular telephone has received the incoming text message from a cellular network;

parsing the message body of the incoming text message by the cordless base station to extract a textual handset identification from the incoming text message; and transmitting the incoming text message to the identified cordless handset to permit the receiving user to view the incoming text message from the sending user via the identified cordless handset.

2. The method of claim 1, wherein receiving an incoming message at the cordless base station comprises using a serial port profile over a short-range radio frequency link and attention (AT) commands.

3. The method of claim 2, wherein the attention (AT) commands comprise a new message indicator (AT+CNMI) command that commands the cellular telephone to send a notification message whenever a new message has been received.

4. The method of claim 2, further comprising periodically polling the cellular telephone, by the cordless base station, to determine whether any new messages have been received.

5. The method of claim 1, further comprising prompting the user of the identified cordless handset to enter a valid password or PIN before allowing the user to view the incoming text message.

6. A method of routing data messages between a cellular telephone and a cordless telephone system, the cordless telephone system having a plurality of cordless handsets configured to communicate with a single cordless base station when in range, the method comprising:
receiving an incoming message at the cordless base station from a cellular telephone after the cellular telephone has received the incoming message from a cellular network;
selecting at least one cordless handset based on information associated with the incoming message, wherein the information associated with the incoming message comprises a telephone number of the message creator;
transmitting the incoming message from the cordless base station to the at least one cordless handset of the plurality of cordless handsets;
storing a list of one or more contacts in a first cordless handset, the list including telephone numbers of each of the contacts; and
transmitting the incoming message to the first cordless handset when the telephone number of the message creator matches a telephone number stored in the list.

7. The method of claim 6, wherein the information associated with the incoming message comprises a telephone number of the message creator, the method further comprising:
storing a list of one or more contacts in the cordless base station, the list including telephone numbers of each of the contacts;
associating the list of one or more contacts with a particular cordless handset or handsets; and
transmitting the incoming message to the cordless handset or handsets associated with the list that includes the telephone number of the creator of the message.

8. The method of claim 7, further comprising adding a contact to a list associated with a particular cordless handset when a user creates an outgoing message on the particular cordless handset and sends the outgoing message to a recipient, the added contact including the telephone number of the recipient.

9. The method of claim 6, wherein the information associated with the incoming message comprises a telephone number of the message creator, the method further comprising:
storing a list of one or more contacts in the cordless base station, the list including telephone numbers of each of the contacts;
associating each contact with a particular cordless handset or handsets; and
transmitting the incoming message to the cordless handset or handsets associated with the contact that includes the telephone number of the creator of the message.

10. The method of claim 6, wherein a routing list is stored in the cordless base station, the routing list containing information relating to the message destination telephone number and an identification of a particular cordless handset.

11. The method of claim 6, further comprising prompting a user of the at least one cordless handset to enter a valid password or PIN before allowing the user to read or view the message.

12. A method of routing data messages between a cellular telephone and a cordless telephone system, the cordless telephone system having a plurality of cordless handsets configured to communicate with a single cordless base station when in range, the method comprising:
receiving an incoming message at the cordless base station from a cellular telephone after the cellular telephone has received the incoming message from a cellular network;
selecting at least one cordless handset based on information associated with the incoming message, wherein the information associated with the incoming message comprises a telephone number of the message creator;
transmitting the incoming message from the cordless base station to the at least one cordless handset of the plurality of cordless handsets;
storing a list of one or more contacts in a first cordless handset, the list including telephone numbers of each of the contacts; and
allowing a user to view the message if the telephone number of the message creator matches a telephone number stored in the list.

13. The method of claim 12, further comprising prompting the user of the at least one cordless handset to enter a valid password or PIN before allowing the user to read or view the message.

14. A cordless telephone system, comprising:
a plurality of cordless handsets, wherein at least one cordless handset of the plurality of cordless handsets includes a list of one or more contacts stored therein; and
a cordless base station having a first radio frequency transceiver and a second radio frequency transceiver, wherein:
the first radio frequency transceiver is configured to transmit and receive data messages to and from a cellular telephone; and
the cordless base station is configured to transmit incoming data messages received from the cellular telephone to the at least one cordless handset of the plurality of cordless handsets based on the list in the at least one cordless handset.

15. The cordless telephone system of claim 14, wherein the at least one cordless handset is configured to prompt a user to enter a valid password or PIN before allowing the user to read or view the incoming data message.

16. The cordless telephone system of claim 14, wherein the cordless base station is configured to transmit the incoming data message to the at least one cordless handset based further upon information associated with the incoming data message.

17. The cordless telephone system of claim 16, wherein:
the information associated with the incoming data message comprises a telephone number of the message creator;
the cordless base station is configured to store a list of one or more contacts;
the list stored in the cordless base station includes telephone numbers of each of the contacts and is associated with a particular cordless handset or handsets; and the cordless base station is configured to transmit the incoming data message to the cordless handset or handsets associated with the list that includes the telephone number of the creator of the message.

18. The cordless telephone system of claim 14, wherein the at least one cordless handset is further configured to add a contact to the list stored therein when a user creates an outgoing message on the at least one cordless handset and sends the outgoing message to a recipient, the added contact including the telephone number of the recipient.

19. The cordless telephone system of claim 16, wherein:
the information associated with the incoming data message comprises a telephone number of the message creator;
the cordless base station includes a list of one or more contacts, the list including telephone numbers of each of the contacts, wherein each contact is associated with a particular cordless handset or handsets;
the cordless base station is configured to transmit the incoming data message to the cordless handset or handsets associated with the contact that includes the telephone number of the creator of the incoming data message.

20. The cordless telephone system of claim 16, wherein:
the cordless base station is configured to store a routing list; and
the routing list includes information relating to the message destination telephone number and an identification of a particular cordless handset.

21. The cordless telephone system of claim 16, wherein:
the information associated with the incoming data message comprises a time stamp of the incoming message; and
the cordless base station is configured to compare the time stamp of the incoming data message with time stamps of outgoing messages sent from each of the cordless handsets and transmit the incoming data message to the cordless handset from which an outgoing message was sent having a time stamp within a predetermined range from the time stamp of the incoming data message.

22. The cordless telephone system of claim 16, wherein:
the information associated with the incoming data message comprises a handset identification embedded within the body of the incoming data message; and
the cordless base station is configured to parse the incoming data message to determine the handset identification and transmit the message to the identified cordless handset.

23. The cordless telephone system of claim 16, wherein:
the information associated with the incoming data message comprises a telephone number of the message creator;
the list of one or more contacts stored in the at least one cordless handset includes telephone numbers of each of the contacts; and
the cordless base station is further configured to transmit the incoming data to the at least one cordless handset when the telephone number of the message creator matches a telephone number stored in the list.

24. The cordless telephone system of claim 16, wherein:
the information associated with the incoming data message comprises a telephone number of the message creator;
the list of one or more contacts stored in the at least one cordless handset includes telephone numbers of each of the contacts; and
the cordless handset is configured to allow a user to view a received message if the telephone number of the message creator matches a telephone number stored in the list.

25. The cordless telephone system of claim 14, wherein the first radio frequency transceiver comprises a serial port profile over a short-range radio frequency link and attention (AT) commands.

26. The cordless telephone system of claim 25, wherein the attention (AT) commands comprise a new message indicator (AT+CNMI) command that commands the cellular telephone to send a notification message whenever a new message has been received.

27. The cordless telephone system of claim 25, wherein the cordless base station periodically polls the cellular telephone to determine whether any new messages have been received.

28. A method comprising:
receiving an incoming message at a cordless base station from a cellular telephone after the cellular telephone has received the message from a cellular network;
comparing a time stamp of the incoming message with time stamps of outgoing messages sent from each handset of a plurality of cordless handsets, and
transmitting the incoming message to the cordless handset from which an outgoing message was sent having a time stamp within a predetermined range from the time stamp of the incoming message.

29. The method of claim 28, wherein receiving an incoming message at the cordless base station comprises using a serial port profile over a short-range radio frequency link and attention (AT) commands comprising a new message indicator (AT+CNMI) command that commands the cellular telephone to send a notification message whenever a new message has been received.

30. The method of claim 28, further comprising periodically polling the cellular telephone, by the cordless base station, to determine whether any new messages have been received.

31. The method of claim 28, further comprising prompting a user of a cordless handset to enter a valid password or PIN before allowing the user to read or view the incoming message.

* * * * *